United States Patent [19]

Lambrecht

[11] 4,439,219
[45] Mar. 27, 1984

[54] FILTER ASSEMBLY HAVING FILTER RETAINER APPARATUS

[76] Inventor: Leonard S. Lambrecht, 2231 N. 73rd Ct., Elmwood Park, Ill. 60635

[21] Appl. No.: 389,595

[22] Filed: Jun. 18, 1982

[51] Int. Cl.$^3$ .............................................. B01D 46/52
[52] U.S. Cl. ........................................ 55/499; 55/501; 55/507; 55/509; 210/493.3; 248/231.1
[58] Field of Search ................ 55/475, 493, 496–501, 55/507, 509; 210/493.1, 493.2, 493.3, 493.4, 493.5; 40/16.6; 49/55; 248/231.2

[56] References Cited

U.S. PATENT DOCUMENTS

| | | | |
|---|---|---|---|
| 2,463,435 | 3/1949 | Smellie | 55/509 |
| 2,895,565 | 7/1959 | Lebrun et al. | 55/501 |
| 3,243,943 | 4/1966 | Getzin | 55/500 |
| 3,393,498 | 7/1968 | Schoen | 55/493 |
| 3,425,165 | 2/1969 | Cleveland | 49/55 |
| 3,774,377 | 11/1973 | Bishop | 55/501 |
| 4,004,899 | 1/1977 | Giacovas | 55/499 |

FOREIGN PATENT DOCUMENTS 944604  6/1956  Fed. Rep. of Germany ........ 55/509

OTHER PUBLICATIONS

Brochure (4 pp., foldout) No. AKL-10-200 "Change-A-Pleat . . . The Disposable Deep Pleat Insert and Frame System . . . " of Air-Kontrol Incorp.

*Primary Examiner*—David L. Lacey
*Attorney, Agent, or Firm*—Leydig, Voit, Osann, Mayer & Holt, Ltd.

[57] ABSTRACT

A filter assembly comprising a filter retainer apparatus, an air filter frame and having a removable pleated filter media. The pleated filter element is secured within the frame by the retainer apparatus which comprises an expandible retainer having elongated flanges disposed on opposite ends. One flange is secured to a rod which slidably fits within a sleeve to which the other flange is attached. Resilient apparatus, preferably an elongated helical spring positioned between the sleeve and the rod, keeps the flanges in spaced relationship. One of the flanges engages one end fold in the filter element and forces it into contact with the frame. The rod is then forced into the sleeve compressing the spring and the other flange engages the other end fold of the filter element, forcing the other end fold into contact with the frame. The spring forces the rod and the sleeve apart so that the flanges securely hold the filter element in the frame. The rod and the sleeve preferably have non-circular cross sections so that the rod cannot rotate within the sleeve, thus keeping the flanges parallel.

4 Claims, 7 Drawing Figures

U.S. Patent    Mar. 27, 1984    4,439,219
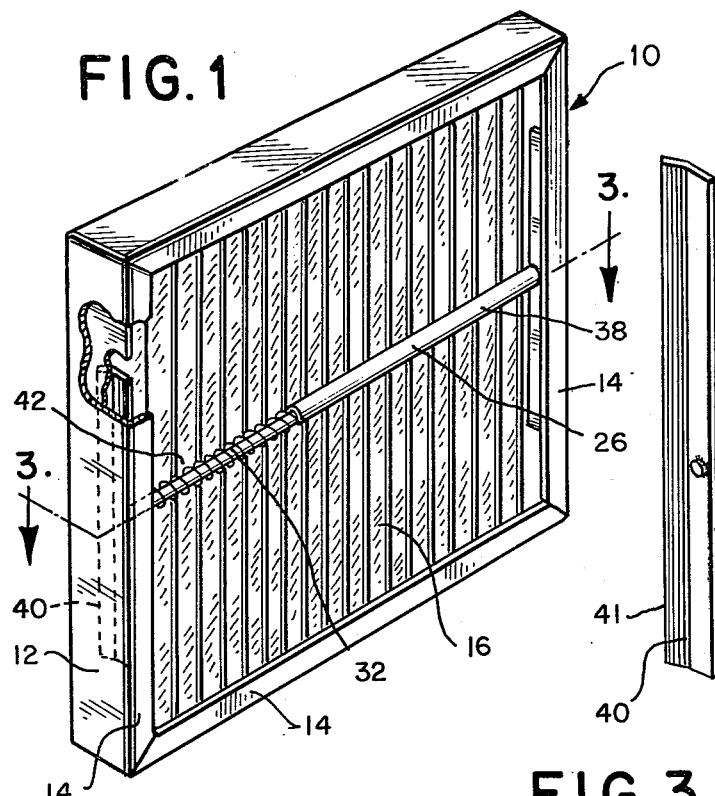
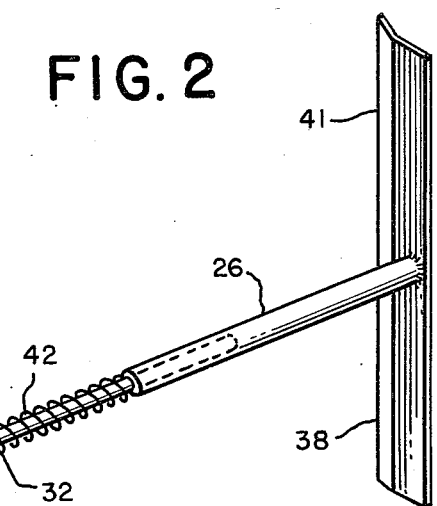
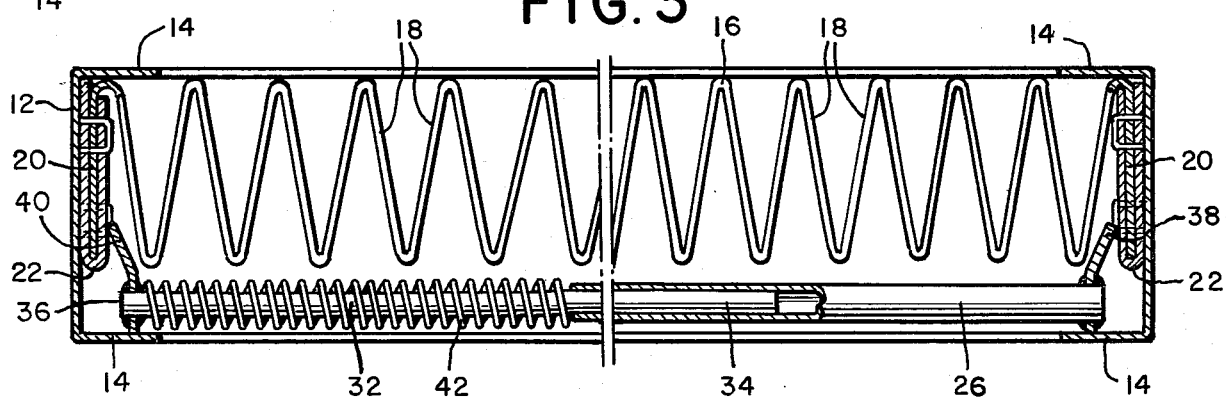
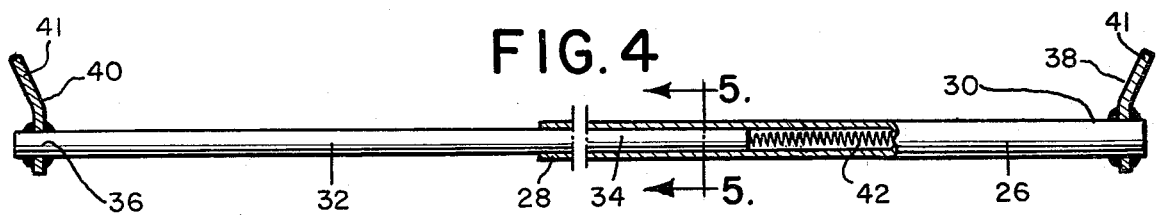
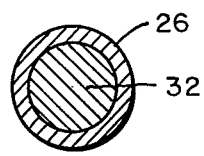
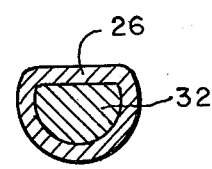
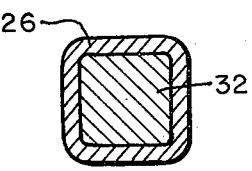

FILTER ASSEMBLY HAVING FILTER RETAINER APPARATUS

DESCRIPTION OF INVENTION

This invention relates generally to disposable air filter systems and more particularly to a retaining apparatus for air filter frames with a disposable pleated filter media.

In recent years there has been a tendency to operate air filter systems at higher levels, resulting in ever greater volumes of air being passed through the filter media for a given quantity of time. This has meant that flat filters become dirty and clogged more quickly, thus requiring more frequent replacement. Because of sensitivity to the higher rate of filter replacement and the ever increasing cost of the replacements, air filters having replaceable pleated filter media have been developed. These filters result in lower replacement costs due to the fact that only the filter media is changed while the frame structure which supports the media is reused.

While filter systems having pleated disposable filter media have resulted in quickly-realized savings to users, devices presently used to retain the filter media within its supporting structure have proven to be awkward and difficult to use, resulting in undue handling of both dirty and replacement filter media. In addition, such devices as gates and tension rods have been essentially usable with only specific size frames corresponding to the retainer device.

It is, accordingly, an object of the present invention to provide a novel retainer apparatus for an air filtering frame system with a removable pleated filter media in which the retainer for the filter media is relatively inexpensive, usable for widely different sized frames, and easy to use, providing for the clean and quick removal of dirty filter media and replacement with clean filter media. It is another object to provide such an air filter retainer which effectively secures and supports the media within the frame.

Other objects and advantages of the invention will become apparent upon reading the attached detailed description and upon reference to the drawings, in which:

FIG. 1 is a perspecive view showing an assembled air filtration system incorporating a filter retainer apparatus constructed in accordance with the invention;

FIG. 2 is a perspective view of the filter element retainer of the instant invention;

FIG. 3 is an enlarged cross-sectional view taken substantially along the line 3—3 in FIG. 1;

FIG. 4 is a plan view partly in section of an alternative embodiment of a filter element retainer in accordance with the invention;

FIG. 5 is a cross-sectional view taken along the line 5—5 in FIG. 4; and

FIGS. 6 and 7 are cross-sectional views similar to FIG. 5 showing alternative shapes for the interfitting element of the filter retainer.

While the invention is described in connection with certain illustrative embodiments, it will be understood that I do not intend to be limited to the particular forms of the invention which are shown but intend, on the contrary, to cover the various alternative and equivalent constructions included within the spirit and scope of the appended claims.

Turning now to the drawings, there is shown in FIG. 1 an air filtering system, generally indicated at 10 having a rectangular frame 12. The frame has inwardly projecting edges 14, giving the frame a U-shaped cross-section, best seen in FIG. 3. The frame is preferably made of galvanized steel and suitably sized to fit in existing applications. Such frames are conventionally made in a number of standard length, width and depth sizings. The frame may also have a wire grid underlay (not shown) disposed on one side to provide positive filter media support.

Placed within the frame 12 is a removable filter element 16. The filter element can be made of polyester or fiberglass and is preferably corrugated, having deep pleats 18. Both opposite end pleats 20 have kraftboard reinforcements 22 folded over them to support the cut edge of the pleat. In its unfolded form, when disposed within the frame, the pleats extend across the frame and are of substantially the same depth as the depth of the frame. Deep pleats are preferred as they result in an increased effective filter area per frame area. A steel support grid may be bonded to the filter media for shape retention.

In accordance with the present invention, a filter element retainer is provided having elongated telescoping members each having flange members carried on opposite ends. Resilient means acting between the members keeps the flanges in spaced apart relationship. When inserting a new filter element, one of the flanges engages one end fold of the filter element, forcing it into contact with the frame. The telescoping members are forced together against the resilient means and the other flange engages the other end fold of the filter element. The resilient means urges both flanges apart to securely hold the end pleats of the filter element in contact with the frame. Because the distance between the flanges depends on the length of the telescoping members and resilient means, these components can be judiciously sized to accommodate the retainer's use with various sized frames, standard or otherwise.

Thus, as shown in the drawings, the first telescoping member is an elongated sleeve 26, preferably made of metal or some other sturdy material. Sleeve 26 has a first end 28 and a second end 30. The second telescoping member is a rod 32 sized to slidingly fit within the sleeve 26. Rod 32 has a first end 34 and a second end 36, the first end 34 being disposed within the first end 28 of the sleeve 26.

Two elongated flanges 38, 40 are secured to the second ends of the sleeve and rod respectively. The flanges 38, 40 are centered on the ends of the sleeve and flange and are attached thereto by, for example, welding. The flanges may advantageously be of a shallow V-shape and attached to the sleeve or rod through one of the legs of the V, that leg being disposed substantially perpendicular to the rod or sleeve causing the flange to have a forwardly projecting edge 41. This leading edge more securely holds the end pleats because the force of the resilient means is distributed over a smaller area than if the entire surface area of the flange engaged the pleat.

As seen in FIG. 4, the spring 42 may alternatively be disposed on the interior of sleeve 26 between flange 38 and the first end 34 of the rod 32. In this way, the spring is shielded from the environment. A further alternative (not shown) is to dispose the spring on the exterior of both the rod and sleeve and abutting both flanges.

In use, one of the flanges 38, 40 is placed behind one of the kraftboard reinforced end pleats 20 and then pushed under the inwardly projecting frame edges 14. The filter element is then extended to the opposite end of the frame and the other flange is pressed to compress the spring in order to place that flange behind the other kraftboard reinforced end pleat 20. When the flange is released, the insert is firmly held under the projecting edges of the frame. In addition to securely holding the filter element within the frame, the sleeve and rod also provide additional support for the filter element.

In one form of the invention, the sleeve and rod are of circular cross-section, as shown in FIG. 5. In this form, the retainer may be made of readily available rod and tube stock. However, in this form the rod 32 may also rotate within the sleeve 26, allowing the two flanges 38, 40 to move out of parallel. In order to keep the flanges in alignment and facilitate easier use of the retainer, the sleeve and the rod may be made of non-circular cross-section. This may be advantageously accomplished with the readily available circular cross-section stock by grinding one side of the rod and crimping the sleeve to achieve the cross-section shown in FIG. 6. Alternatively, as shown in FIG. 7, square stock may be used for the sleeve and the rod.

Thus, it is apparent that there has been provided, in accordance with the invention, a retaining apparatus for an air filter that fully satisfies the objects set forth above. It is evident that many alternatives, modifications, and variations of the disclosed embodiments will be apparent to those skilled in the art. Accordingly, it is intended to enhance all such alternatives, modifications, and variations as set forth within the spirit and scope of the appended claims.

What is claimed is:

1. A filter assembly comprising, in combination, an open sided rectangular frame with side walls spaced-apart to define a width, a disposable pleated filter element located within said frame and a filter element retainer overlying said filter element between said side walls and comprising elongated telescoping members having interfitting and outer ends, a pair of transversely oriented and outwardly projecting flanges engaging said pleated filter element, one of said flanges secured to each of said outer ends of said telescoping members, and resilient means interposed between said flanges and positioned to urge said telescoping members to a length greater than the width of said frame so that said filter retainer apparatus securely holds said pleated filter element in said frame.

2. The filter assembly of claim 1 in which said elongated telescoping members comprise an elongated sleeve and a rod sized to slidingly fit within said sleeve and said resilient means comprises a helical spring which is disposed on said rod between the outer end of said rod and the interfitting end of said sleeve.

3. The filter assembly of claim 1 in which said elongated telescoping members comprise an elongated sleeve and a rod sized to slidingly fit within said sleeve and said resilient means comprises a helical spring which is disposed within said sleeve between the outer end of said sleeve and the interfitting end of said rod.

4. The filter assembly of claim 2 or claim 3 in which both said sleeve and said rod sized to slidingly fit therein have non-circular cross sections so that said rod cannot rotate within said sleeve.

* * * * *